United States Patent [19]

Koski et al.

[11] 4,242,477

[45] Dec. 30, 1980

[54] ASCORBATE SHORT-STOPS

[75] Inventors: Ahti A. Koski, Brigden; Melvin J. G. Davidson, Sarnia, both of Canada

[73] Assignee: Polysar Limited, Sarnia, Canada

[21] Appl. No.: 100,298

[22] Filed: Dec. 5, 1979

[30] Foreign Application Priority Data

Aug. 1, 1979 [CA] Canada .................................. 332982

[51] Int. Cl.$^3$ ............................................... C08F 2/42
[52] U.S. Cl. ...................................................... 526/84
[58] Field of Search ............................................ 526/84

[56] References Cited

U.S. PATENT DOCUMENTS

| | | | |
|---|---|---|---|
| 2,430,590 | 11/1947 | Stewart | 260/86.5 |
| 2,762,791 | 9/1956 | Pease et al. | 260/94.9 |
| 3,382,223 | 5/1968 | Borsini et al. | 260/92.8 |

*Primary Examiner*—Stanford M. Levin
*Attorney, Agent, or Firm*—Stevens, Davis, Miller & Mosher

[57] ABSTRACT

The polymerization of butadiene and styrene in an emulsion, free-radical polymerization process using a persulphate initiator is effectively short-stopped by the addition of ascorbic acid or the sodium or potassium salts thereof. The butadiene-styrene polymer so produced may be used in those end uses generally associated with the prior known use of such polymers.

7 Claims, No Drawings

ASCORBATE SHORT-STOPS

This invention is directed to an improved process for stopping the polymerization of monomers in an aqueous emulsion free radical polymerization process.

The field of aqueous emulsion free radical polymerization constitutes a well established art. The systems now used were generally established in the 1940's and the 1950's. It is well established practice that, for quality control reasons, the polymerization of butadiene and styrene to produce the well known butadiene-styrene rubbery polymer is generally stopped at predetermined conversions. Stopping of the polymerization is achieved by the addition of suitable chemicals which react with the free radicals in the system to terminate further reaction. Such chemicals are known as short-stops and include hydroquinone and substituted hydroquinones, the water soluble dithiocarbamates especially the dialkyldithio-carbamates, diethylhydroxylamine, dinitrochlorobenzene, dihydroxydiphenyl sulphide and dinitrophenylbenzothiazyl sulphide. An effective short-stop must stop the polymerization rapidly, not cause or lead to a change in the molecular weight of the polymer and preferably not cause any odor or color development in the polymer. In the hot polymerization of butadiene and styrene, the short-stop generally used is one of sodium dimethyldithiocarbamate and/or diethylhydroxylamine or hydroquinone. The quantity of short-stop used must be carefully controlled because the presence of excess dithiocarbamate short-stop can lead to an odor in the polymer, scorch during compounding and possible discoloration of the polymer and excess diethylhydroxylamine may be associated with toxic side effects.

We have now discovered for the hot polymerization of butadiene and styrene in an emulsion, free-radical polymerization process an improved process for short-stopping the polymerization, the improvement being the addition as short-stop of ascorbic acid or the sodium or potassium salts thereof.

According to our invention, there is provided an improved process for short-stopping the polymerization of butadiene and styrene in an emulsion, free-radical polymerization process conducted at from about 40° to about 60° C. using potassium or ammonium persulphate as polymerization initiator, the improvement being the use as short-stop of ascorbic acid or the sodium or potassium salts thereof, the quantity of ascorbic acid or salt thereof added as short-stop being from about 0.1 to about 0.75 parts by weight per 100 parts by weight of butadiene plus styrene charged to the polymerization system.

In hot emulsion polymerization systems, a mixture of butadiene and styrene generally in a weight ratio of from about 80:20 to about 50.50 and most preferably in a weight ratio of from about 80:20 to about 70:30 is polymerized to a conversion of monomers of from about 55 to about 75 percent, preferably from about 60 to 70 percent. The emulsifier used is generally a fatty acid soap and the polymerization recipe may contain a small amount of one or more electrolytes such as trisodium phosphate or potassium chloride. The molecular weight of the polymer is controlled by the presence of a chain transfer agent or modifier such as the $C_{10}$ to $C_{14}$ mercaptans. The polymerization initiator is potassium or ammonium persulphate. The temperature of the polymerization is from about 40° to about 60° C., preferably from about 45° to about 55° C. and most preferably from about 48° to about 52° C. A typical polymerization recipe would be, in parts by weight:

| Monomers | 100 |
| Water | 180 |
| Emulsifier | 5 ± 1 |
| Modifier | 0.5 ± 0.25 |
| Initiator | 0.3 ± 0.1 |
| Electrolyte | 0.2 ± 0.05 |

Polymerization in such a recipe using a 75:25 weight ratio of butadiene:styrene and potassium persulphate as initiator at a temperature of 50° C. would normally achieve about 70±5 percent conversion of the monomers in about 10 to 12 hours at which point it may be stopped by addition of short-stop.

After reaching the desired conversion of monomers to polymer and short-stopping of the polymerization, the latex is treated to remove the unreacted monomers. The short-stop must effectively prevent further formation of polymer during the removal of unreacted monomers. The latex is passed to one or more, and generally two, tanks in which the pressure is finally reduced to about 20 cm of mercury and in which a major proportion of the unreacted butadiene is vaporized and removed as an overhead vapor stream. The latex is then passed to a stripping column in which any remaining butadiene and the unreacted styrene is removed. In such a stripping column, the latex flows downwardly over a series of perforated trays and stream is passed upwardly through the trays, the stripped butadiene, styrene and steam being removed from the top of the column. The stripped latex is removed from the bottom of the column and passed to either coagulation and recovery facilities for recovery of dry polymer or to concentrating facilities for production of latex having from about 45 to about 65 percent polymer solids.

We have found that the latex from the polymerization reactor may be effectively short-stopped by the addition thereto of an aqueous solution of ascorbic acid or the sodium or potassium salts thereof. It is preferred that when ascorbic acid is used it be used as an aqueous solution containing a buffering electrolyte such as trisodium phosphate. It is surprising that ascorbic acid or the sodium or potassium salts will act as a short-stop in the light of the previous use of these materials as components of polymerization initiator systems in emulsion, free-radical polymerization and in the light of the finding that these materials will not act as short-stops in the cold redox or hot redox polymerization systems.

The quantity of ascorbic acid or sodium or potassium salt is from about 0.1 to about 0.75 parts by weight per 100 parts by weight of butadiene plus styrene charged to the polymerization. Preferably, the quantity of short-stop used is from about 0.1 to about 0.5, and most preferably from about 0.15 to about 0.3, parts by weight per 100 parts by weight of butadiene plus styrene charged.

Polymer produced in a process in which ascorbic acid or the defined salts have been used as short-stop does not discolor, has no odor and appears not to contain chemicals detrimental to the use of the polymer in food or drug related applications. The polymer from such a process may be used in those end uses generally associated with the prior known such polymer types, including mechanical goods, coatings, etc.

The following examples illustrate the invention herein described.

EXAMPLES 1-4

Styrene and butadiene were copolymerized in a hot polymerization recipe using 750 ml glass polymerization bottles. An emulsifier solution was prepared by dissolving 5.75 g of sodium hydroxide, 28.0 g of polymerization grade fatty acid, 1.5 g of dry tri-sodium phosphate and 0.15 g of ethylenediamine tetra-acetic acid in 1310 g of distilled water. 269 g of this emulsifier solution was charged to each bottle. A styrene-mercaptan mixture was prepared by mixing 225 g of styrene and 2.05 g of tert-dodecyl mercaptan. 45.4 g of this mixture was charged to each bottle. The initiator solution was prepared by dissolving 1.88 g of potassium persulphate in 50 g of distilled water—10 ml of this solution was charged to each bottle. The polymerization temperature was 50° C. and the polymerization time was 9 hours. As the control short-stop, 7.5 g of sodium dimethyldithiocarbamate was dissolved in 92.5 g of distilled water—5 ml of this solution was used as short-stop (Example 1). As an example of the short-stop of this invention, 4.52 g of ascorbic acid was mixed with 50.29 g of distilled water and 1.29 g of a 10% solution of sodium hydroxide in distilled water. The volume of this sodium ascorbate short-stop used for each bottle is shown in Examples 2, 3 and 4 in Table I. The solids contents (i.e. polymer content) for each experiment are shown in Table I for varying periods of time after the short-stop was added.

The results in Table I clearly show that sodium ascorbate effectively acts as a short-stop for the polymerization and is at least as effective as the control.

TABLE I

| Example # | 1 (Control) | 2 | 3 | 4 |
|---|---|---|---|---|
| Wt. % solids at X minutes before short-stop added | 23.7 30 | 24.1 30 | 24.4 25 | 24.4 25 |
| Short-stop Type | Carbamate | Sodium | | Ascorbate |
| Volume, short-stop added (mls) | 5 | 1.8 | 5.4 | 9.0 |
| Short-stop, parts by wt. based on monomers | 0.1 | 0.1 | 0.3 | 0.5 |
| Wt. % solids at 15 minutes after short-stop added | 25.5 | 25.3 | 25.2 | 25.4 |
| Wt. % solids at 4 hours after short-stop added | 26.0 | 26.3 | 25.7 | 25.4 |
| Wt. % solids at 14 hours after short-stop added | 27.0 | 26.4 | 25.6 | 25.4 |

EXAMPLES 5-8 (Controls)

Styrene and butadiene were polymerized in a hot redox polymerization recipe using 750 ml polymerization bottles. Using a fatty acid based emulfifier system and a tert-dodecyl mercaptan modifier, butadiene and styrene were polymerized at 50° C. with a hydroperoxide-sodium formaldehyde sulphoxylate initiator-activator system. A carbamate short-stop was made up by dissolving 20 g of a 40% aqueous solution of sodium dimethyldithiocarbamate, 4 g of ethylenediamine tetraacetic acid, 2.16 g of sodium hydroxide and 0.94 g of an 85% solution of diethylhydroxylamine in 200 g of distilled water. A sodium ascorbate short-stop was made up as described in Examples 1-4. Polymerization was for 5.75 hours at which time the short-stop solution was added—the bottles were left in the polymerization bath at 50° C. after the short-stop was added and the solids determined after fixed periods of time. The results are shown in Table II from which it is clear that sodium ascorbate does not act as a short-stop in this polymerization system, as shown by the continued increase in solids.

TABLE II

| Example # | 5 | 6 | 7 | 8 |
|---|---|---|---|---|
| Wt. % solids at time short-stop added | 26.95 | 25.8 | 26.1 | 26.5 |
| Short-stop Type | Carbamate | Sodium | | Ascorbate |
| Volume, short-stop (ml) | 5 | 2.2 | 4.4 | 13.3 |
| Short-stop, parts by weight based on monomers | 0.1 | 0.05 | 0.1 | 0.3 |
| Wt. % solids at time (hrs) after short-stop added | 27.0 0.75 | 28.6 0.75 | 28.95 1.0 | 28.1 1.0 |
| Wt. % solids at time (hrs) after short-stop added | 27.3 13 | 34.2 13 | 33.3 13.25 | 32.3 13.25 |

EXAMPLES 9 AND 10 (Controls)

Acrylonitrile and butadiene were polymerized in a cold redox recipe in 750 ml polymerization bottles. Using a sulphonate type emulsifier and a dodecyl mercaptan modifier, butadiene and acrylonitrile were polymerized using a hydroperoxide-sodium formaldehyde sulphoxylate-ferrous sulphate system.

The polymerization was allowed to proceed at 13° C. for 16 hours at which time short-stop was added. To one bottle was added a solution of diethylhydroxylamine and to a second bottle was added a solution of sodium ascorbate. The diethylhydroxylamine short-stop was a 5% solution in water and 10 mls (equivalent to 0.25 parts by weight per 100 parts by weight of monomers charged) were added. The sodium ascorbate was a 8.1% solution in water and 5 mls (equivalent to 0.2 parts by weight per 100 parts by weight of monomers charged) were added.

TABLE III

| Example # | 9 | 10 |
|---|---|---|
| Solids at 16 hours Wt. % | 34.2 | 33.2 |
| | Add Short-stop | |
| Short-stop Type | Diethylhydroxylamine | Sodium Ascorbate |
| Solids at 21 hours, Wt. % | 33.4 | 35.0 |
| | Bottles left at room temperature | |
| Solids after 20 hours at room temp. Wt. % | 33.1 | 38.9 |

From the results in Examples 9 and 10, it is clear that sodium ascorbate does not function as a short-stop for this polymerization system, whereas the diethylhydroxylamine does effectively short-stop the polymerization.

What is claimed is:

1. An improved process for short-stopping the polymerization of butadiene and styrene in an emulsion, free-radical polymerization process conducted at from about 40° to about 60° C. using potassium or ammonium persulphate as polymerization initiator, characterized in that the short-stop is ascorbic acid or the sodium or potassium salts thereof, the quantity of ascorbic acid or salt thereof added as short-stop being from about 0.1 to about 0.75 parts by weight per 100 parts by weight of butadiene plus styrene charged to the polymerization system.

2. The process of claim 1 characterized in that the weight ratio of butadiene:styrene is from about 80:20 to about 50:50.

3. The process of claim 1 characterized in that the conversion to polymer of butadiene and styrene is from about 55 to about 75 percent.

4. The process of claim 1 characterized in that the quantity of short-stop is from about 0.1 to about 0.5 parts by weight per 100 parts by weight of butadiene plus styrene charged.

5. The process of claim 1 characterized in that the weight ratio of butadiene:styrene is from about 80:20 to about 70:30, the polymerization initiator is potassium persulphate, the polymerization temperature is from about 45° to about 55° C., the conversion to polymer of butadiene and styrene is from about 60 to about 70 percent and the short-stop is sodium ascorbate.

6. The process of claim 1 characterized in that the weight ratio of butadiene:styrene is from about 80:20 to about 70:30, the polymerization initiator is potassium persulphate, the polymerization temperature is from about 45° to about 55° C., the conversion to polymer of butadiene and styrene is from about 60 to about 70 percent and the short-stop is ascorbic acid added as an aqueous solution containing tri-sodium phosphate.

7. The process of claim 1 characterized in that the weight ratio of butadiene:styrene is from about 80:20 to about 70:30, the polymerization initiator is potassium persulphate, the polymerization temperature is from about 45° to about 55° C., the conversion to polymer of butadiene and styrene is from about 60 to 70 percent and the short-stop is potassium ascorbate.

* * * * *